Feb. 3, 1970     MATAICHI TAJIMA     3,493,748

METHOD AND APPARATUS FOR PRODUCING COLORED RADIOGRAPH

Filed May 9, 1966

INVENTOR.
MATAICHI TAJIMA

BY

*Sughrue, Rothwell, Mion, Zinn & Macpeak*

ATTORNEYS

United States Patent Office 3,493,748
Patented Feb. 3, 1970

3,493,748
METHOD AND APPARATUS FOR PRODUCING COLORED RADIOGRAPH
Mataichi Tajima, Ashigara-Kamigun, Kanagawa, Japan, assignor to Fuji Shashin Film Kabushiki Kaisha, Ashigara-Kamigun, Kanagawa, Japan
Filed May 9, 1966, Ser. No. 548,669
Claims priority, application Japan, May 8, 1965, 40/26,782
Int. Cl. G01n 21/00; H01j 37/22; H05g 1/60
U.S. Cl. 250—65
11 Claims

ABSTRACT OF THE DISCLOSURE

Both a method for producing a colored radiograph and apparatus for producing the same are disclosed. The apparatus comprises a radiation source, which is arranged so as to direct radiation upon a fluorescent screen. The object to be radiographed is generally interposed between the radiation source and the fluorescent screen. Movable light filter means are provided between the fluorescent screen and an optical imaging system which is utilized to focus visible light from the fluorescent screen upon a photosensitive color film. The color filter means comprises at least two color filters and is utilized in combination with means to insert and withdraw the separate color filters into the path of the visible light from the fluorescent screen. The method, which may be practiced with the apparatus described, basically comprises irradiating an object with radiation, then passing the radiation onto a fluorescent screen disposed behind the object to gain a visible image, and then passing the light which forms the visible image along a path wherein the light is alternately passed through at least two color filter means, the light then passing through a lens and being focused upon the color photosensitive film.

---

This invention relates to a method and apparatus for making a color radiograph which represents the difference in the transmission of radiations through an object as a difference in color or optical density.

In conventional black-white radiography, the photographic density and tone composing the images should be restricted carefully between upper and lower limits in order to distinguish more clearly fine parts of an object. Furthermore, even though it is desired to enlarge the allowance to exposure, narrow limits are unavoidable due to the restriction about the photographic density and tone.

This invention aims to ease remarkably these restrictions and to enlarge the allowance to exposure to two times or more, whereby the photographic recording of an object composed of parts having various radiation absorption factors can be accomplished more accurately.

In accordance with the present invention, the allowance to exposure can be enlarged and difficulties relating to the exposure to radiation reduced by dividing the light from a fluorescent screen, which is caused to fluoresce under radiation by means of a color filter and exposing a color film, having at least two sensitive color forming layers differing in sensitivity characteristics, to said light. The fluorescent light may be divided by a color filter having different densities and subsequently directed to a color film having at least two color forming layers having equal sensitivity characteristics.

Figure 1:
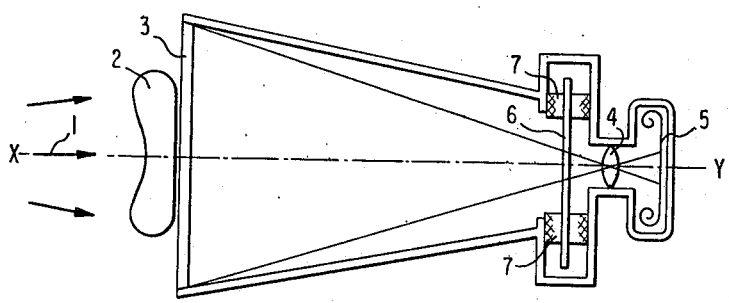
Figure 2A:
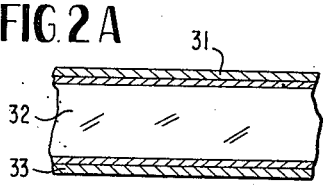
Figure 3:
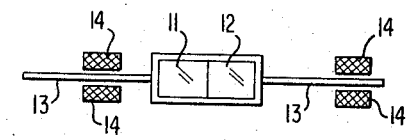
Figure 2B:
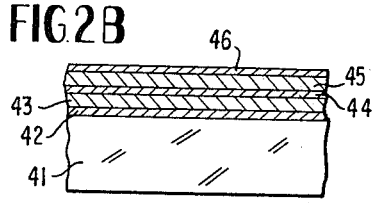
Figure 4A:
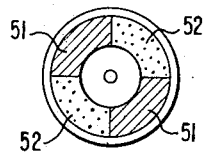
Figure 4B:
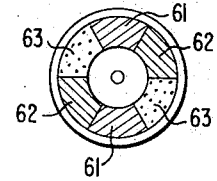
Figure 5A:
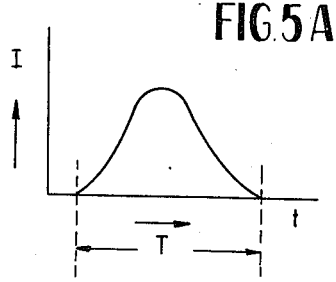
Figure 6:
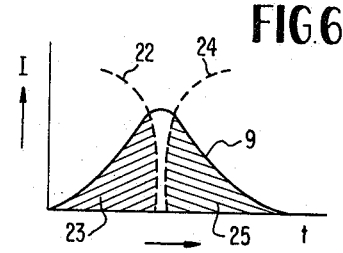
Figure 5B:
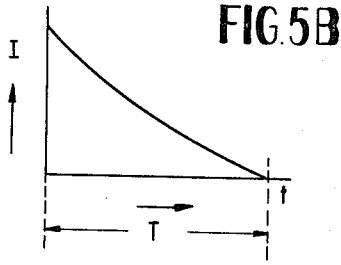
Figure 7A:
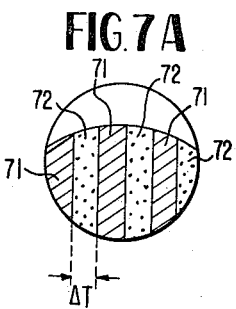
Figure 7B:
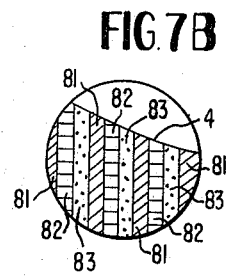

The invention is further illustrated in the accompanying drawings wherein FIGURE 1 is a view of one embodiment of the invention improving the ordinary indirect photography device using X-rays; FIGURES 2A and 2B are schematic cross-sections of different light sensitive materials; FIGURE 3 is a front view of an optical filter movable right and left; FIGURES 4A and 4B are front views of other rotatable optical filters; FIGURES 5A and 5B are graphs representative of current waves of X-rays; FIGURE 6 is a graph to illustrate the dividing of a current wave of X-rays, and FIGURES 7A and 7B show parts of current waves enlarged to illustrate the optical operation.

With particular reference to FIGURE 1, in the ordinary X-ray photograph device in which X-rays 1 form a shadow of an object 2 on a fluorescent plate 3 and the image formation of the fluorescing image is formed on a photographic film 5 through a camera lens 4, the composition of the fluorescent plate is so selected as to fluoresce light of the proper wave length in accordance with the particular color filter 6 which is used to change the color light characteristics and which is movably inserted in the optical axis between the fluorescent plate and film, and color film is utilized in lieu of conventional black-white film. The filter 6 is moved by solenoids 7.

FIGURES 5A and 5B show a form of current wave by an X-ray producing device of the filament-impressed type and by another X-ray producing device of the high voltage-impressed type, respectively. The following is to illustrate an example of making a color photograph by the current wave as shown in FIGURE 5A. FIGURE 3 shows color filters similar to filter 6, for example, blue filter 11 and red filter 12 arranged in parallel and supported by iron rods 13 capable of moving these color filters right and left by liner solenoids 14 using the iron rods as cores. A relationship between the operation time of these filters and X-ray producing time shown by FIGURE 5A is illustrated in FIGURE 6 wherein the fluorescence produced by the current wave 9 is shown on the left side of a dotted line 22 as it passes through a blue filter in the initial stage and on the right side of another dotted line 24 as it passes through a red filter in the latter stage. The effective time required for the light passing through each filter contributes to photographic sensitization which is shown as shaded portions 23 and 25. In using a color film upon which a reversal type two color forming emulsion is applied on both sides (high sensitive red color forming emulsion layers 31, support 32 and low sensitive blue color forming emulsion layer 33) as a color sensitive material (see FIGURE 2A), an object which is readily permeable to X-rays, such as the lungs, produces a suitable color image on the low sensitive blue color forming layer during the initial exposure, while an object which is barely permeable, such as the heart, produces a suitable color image on the high sensitive red color forming layer during the latter exposure, while the image formed during the initial exposure becomes transparent by the excess exposure. That is to say, the heart portion is exhibited as a red image in a uniform blue view field and the lung portion as a blue image, respectively, in the color photograph. Also, in a multilayer type sensitive material as shown in FIGURE 2B, the same effect as mentioned above is observed, and the sensitive material is comprised of a support 41, subbing layer 42, red sensitive cyan color forming emulsion 43, filter layer 44, blue sensitive magenta color forming emulsion 45 and protective film 46.

Moreover, a color photograph may be made on a color film having light sensitive layers similar in the sensitivity characteristics by changing the density of a filter. That is, the fluorescence produced by the current wave 9 of FIGURE 6 is shown on the left portion 23 of dotted line 22 as it passes through a high density red filter during the initial stage and on the right portion 25 of dotted line 24 as it passes through a low density blue filter during the latter stage. When a negative color forming sensitive material is used in this case, for example, an object readily permeable to X-rays, such as the lungs, produces a suitable color image on the cyan color forming layer through the high density red filter during the initial exposure, while an object hardly permeable to X-rays, such as the heart, becomes transparent without color forming, and then the heart portion brings a suitable color image on the yellow color forming layer through the blue filter during the latter exposure, while the lung portion is subject to excess exposure to form a uniform yellow color image. That is to say, the heart portion is exhibited as a yellow image and the lung portion as a cyan image in a yellow view field, respectively, in the finished photograph.

A method of making a color photograph by either the wave form of FIGURE 5A or FIGURE 5B is further illustrated. FIGURE 4A shows a circular alternate arrangement of two color filters 51 and 52 having different colors and densities, and FIGURE 4B shows a circular alternate arrangement of three color filters 61, 62 and 63 having different colors and densities. These circular filters are revolved at a high velocity during the generation of X-rays, whereby the exposure is carried out for every color.

When T of FIGURE 5 is 0.1 second and the circular color filter of FIGURE 4A is revolved five times in this time, the time $\Delta T$ exposed by one filter is given as follows:

$$\Delta T = T/F \cdot M$$

Therefore, $\Delta T = 5 \times 10^{-3}$ second
F: Number of filters
M: Revolution number of filter FIGURES 7A and 7B show enlarged schematic views about the state of dividing exposure by the circular filter of FIGURE 4, FIGURE 7A being that of dividing exposure of the wave form of FIGURE 5A by the circular filter of FIGURE 4A and FIGURE 7B being that of dividing exposure of the wave form of FIGURE 5B by the circular filter of FIGURE 4B. 71 and 72 of FIGURE 7A are color light portions divided and filtered respectively by the circular filters 51 and 52 of FIGURE 4A from the wave form of FIGURE 5A, and 81, 82 and 83 of FIGURE 7B are color light portions divided and filtered by the circular filters 61, 62 and 63 of FIGURE 4B from the wave form of FIGURE 5B.

Each color light, being obtained by dividing and filtering light from a fluorescent plate fluorescing by X-rays permeating through an object by means of a filter having different color portions which are equal in optical density, sensitizes a color film having sensitive layers different in the sensitivity characteristics, each forming a color in accordance with each color light, thereby producing a colored photograph. When the light from a fluorescent plate fluorescing by X-ray radiation permeating through an object is divided and filtered by another filter having different colors and different optical densities, each resulting colored light sensitizes a color film having sensitive layers with similar sensitivity characteristics, each of which forms a color in accordance with each colored light, thereby producing a colored photograph. If the composition of a fluorescent plate is so selected as to fluoresce light of the proper wave length in accordance with the particular color filters, if such a color film which is adapted to sensitize and form colors in accordance with the spectroscopic permeability of each color filter is used and if the optical density and color of each color filter is selected in accordance with the color sensing property, color forming property of a color film and the distribution state of X-ray permeabilities through an object, a better colored photograph will be obtained.

Our invention is further illustrated by the following example:

A light sensitive film was prepared by eliminating one layer from a multilayer type color film carrying three sensitive emulsions. That is, a reversal type light sensitive material having emulsions corresponding to the blue sensitive magenta color forming emulsion 45 and red sensitive cyan color forming emulsion 43 as in FIGURE 2B was employed. A fluorescent screen was coated with a mixture of blue fluorescing agent and red fluorescing agent. The exposure was carried out while generating 50 kvp. X-rays of 0.4 second by an X-ray device of the filament-impressed type, and exposing synchronously a blue filter to the optical axis for the first 0.16 second and after about 0.09 second exposing a red filter thereto for the last 0.15 second. Using a finger as an object to be photographed, the bone portion was exhibited as a magenta plus cyan color image and the skin and flesh portions as a cyan single color image.

In the usual black-white X-ray radiograph, it is impossible to photograph the bone portion and the skin and flesh portions as a photographic image by one exposure, but the present invention may give the following features:

(1) Since an object can be photographed over a wide range, a minute examination will be possible.

(2) Failures in the exposure can be reduced.

In particular, the feature (1) is effective for the surgical examination of bone fractures and stomach cancer, and makes it possible to conduct the simultaneous photographing of the lungs and heart shadows at the breast, which has been impossible in the prior art.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for producing a colored radiograph comprising radiation source means, fluorescent screen means capable of yielding a visible image, movable visible light filter means and color sensitive material means aligned along a common axis, said color sensitive material means comprising at least two types of color photosensitive materials, said filter means comprised of at least two color filters adapted to be shifted into axial alignment with said screen means and said sensitive means in a predetermined sequence and means for shifting said filters whereby an image of an object, placed between said source and said screen so as to receive direct radiation from said source, is directed onto said color sensitive material means through said filters in said predetermined sequence.

2. Apparatus according to claim 1 wherein said movable light filter means is composed of a plurality of light filters mounted side by side in the same plane and said means for moving said filter means comprise a pair of solenoids having armature means secured to said filter means and adapted to reciprocate said light filters into and out of alignment with said common axis.

3. Apparatus according to claim 1 wherein said movable light filter means is comprised of a plurality of light filters mounted concentrically about the axis of a rotatable disc whereby each filter is sequentially aligned along said common axis as said disc is rotated.

4. An apparatus according to claim 1 wherein said screen means is provided with a fluorescent composition adapted to fluorescence light having wave lengths which said filter means are adapted to pass.

5. An apparatus according to claim 1 wherein said sensitive means comprises a film having a plurality of color sensitive layers thereon.

6. An apparatus according to claim 5 wherein said color sensitive layers are disposed on opposite sides of said film.

7. Apparatus according to claim 5 wherein said color sensitive layers are superimposed upon each other on the same side of said film.

8. Apparatus according to claim 5 wherein said color sensitive layers have the same sensitivity characteristic and said filters have different optical densities.

9. Apparatus according to claim 5 wherein said color sensitive layers have different sensitivity charatceristics and said filters have the same optical densities.

10. A method for making a colored radiograph comprising (a) passing direct radiation through an object to be examined
(b) forming a visible fluorescent colored image of said object on a fluorescent screen
(c) filtering the light from said visible fluorescent colored image through at least two color filters, which have different color and optical densities, in a predetermined sequence, the color filters thus being interposed into the light path from said visible fluorescent colored image, and
(d) forming a multi-colored image of said object on a color sensitive material having at least two color sensitive layers which have the same photosensitive characteristics.

11. A method for making a colored radiograph comprising
 (a) passing direct radiation through an object to be examined,
 (b) forming a visible fluorescent colored image of said object on a fluorescent screen,
 (c) filtering the light from said visible fluorescent colored image through at least two color filters, which have a different color density but equal optical density in a predetermined sequence, whereby said color filters are interposed into the light path of the light from said visible fluorescent colored image, and
 (d) forming a multi-colored image of said object on a color sensitive material having at least two color sensitive layers which are of different photosensitive characteristics.

References Cited
UNITED STATES PATENTS

| | | | |
|---|---|---|---|
| 2,807,725 | 9/1957 | Schwerin | 250—65 |
| 3,229,089 | 1/1966 | Sasao | 250—65 |

RALPH G. NILSON, Primary Examiner

S. C. SHEAR, Assistant Examiner